United States Patent [19]

Malone, Sr.

[11] Patent Number: 5,530,705
[45] Date of Patent: Jun. 25, 1996

[54] SOFT ERROR RECOVERY SYSTEM AND METHOD

[75] Inventor: Daniel J. Malone, Sr., San Jose, Calif.

[73] Assignee: International Business Machines Corporation, Armonk, N.Y.

[21] Appl. No.: 385,283

[22] Filed: Feb. 8, 1995

[51] Int. Cl.$^6$ .................................................. G06F 11/00
[52] U.S. Cl. .......................... 371/5.1; 365/201; 371/21.1
[58] Field of Search ................................. 371/5.1, 47.1, 371/5.5, 21.4, 21.1, 15.1; 360/62, 26, 36, 38, 47, 53; 365/201

[56] References Cited

U.S. PATENT DOCUMENTS

| | | | |
|---|---|---|---|
| 3,704,363 | 11/1972 | Salmassy et al. | 235/153 |
| 3,790,954 | 2/1974 | Devore et al. | 340/146.1 |
| 4,866,712 | 9/1989 | Chao | 371/5.1 |
| 4,922,491 | 5/1990 | Coale | 371/16.1 |
| 4,993,029 | 2/1991 | Galbraith et al. | 371/40.1 |
| 5,053,892 | 10/1991 | Supino, Jr. et al. | 360/62 |
| 5,090,014 | 2/1992 | Polich et al. | 371/15.1 |

*Primary Examiner*—Robert W. Beausoliel, Jr.
*Assistant Examiner*—Phung M. Chung
*Attorney, Agent, or Firm*—Ohlandt, Greeley, Ruggiero & Perle

[57] ABSTRACT

A method for reducing errors in data read from a disk drive comprises the steps of: determining errors in data read from a transducer in the disk drive; correcting the errors in data through the use of error correction circuitry; maintaining a metric of the errors in data that are read from the transducer; and when the metric reaches a threshold value, applying a toggle procedure to the transducer in an attempt to improve the transducer's performance. The method further contemplates periodically applying a toggle procedure to the transducer in an attempt to reduce the errors in data, in addition to the application of a toggle procedure when the threshold value is reached.

8 Claims, 2 Drawing Sheets

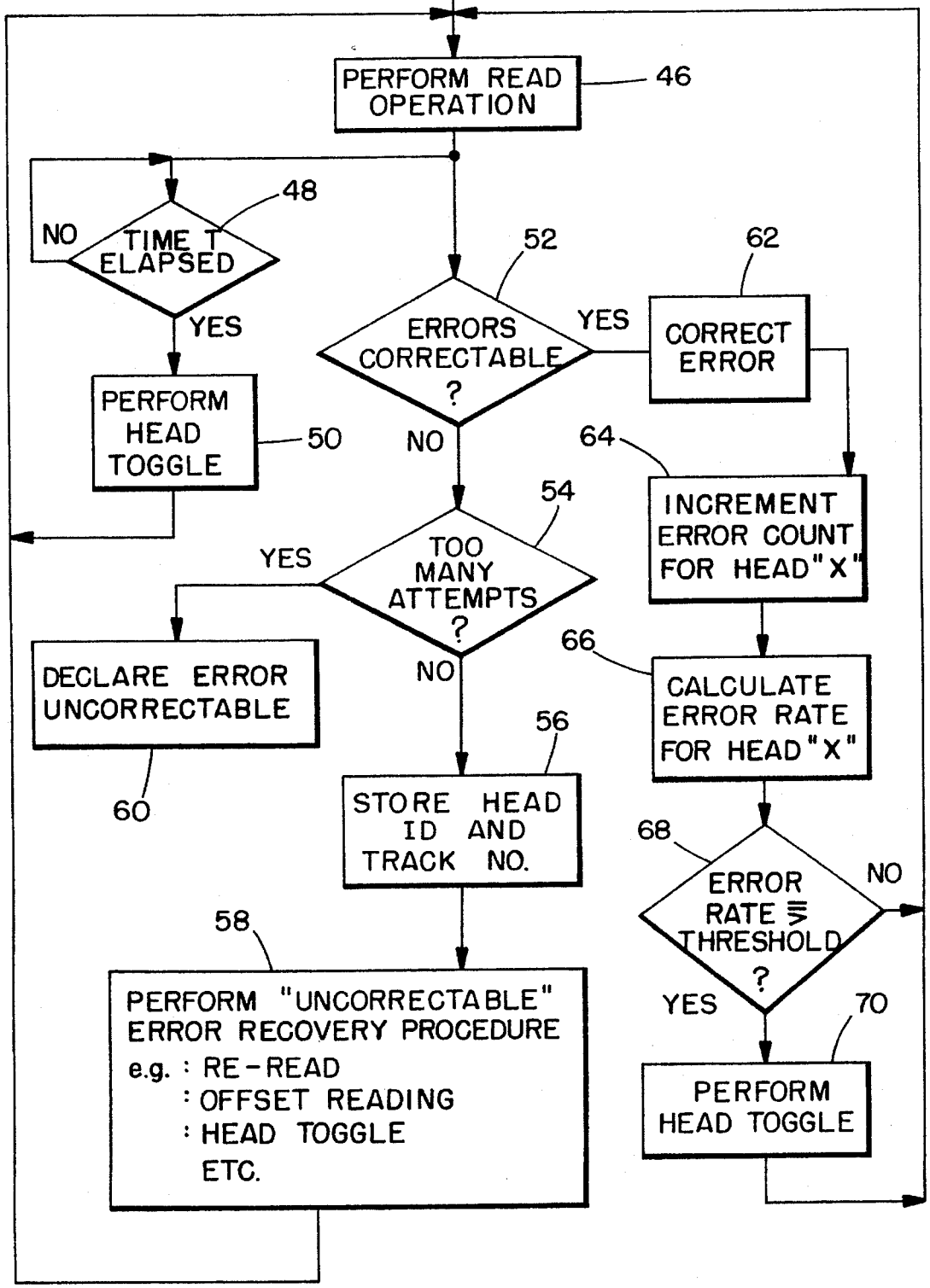

SOFT ERROR RECOVERY SYSTEM AND METHOD

FIELD OF THE INVENTION

This invention relates to a method and apparatus for reduction of data errors from a disk drive and, more particularly, to a technique for reducing soft errors in data by either periodic toggling of a transducer head or by toggling of a transducer head before an uncorrectable error state has been reached.

BACKGROUND OF THE INVENTION

Data read from disk drives manifests both hard and soft errors. A hard error is one which often results from a mechanical fault in the system and is not correctable by error correction logic even after many rereads and error recovery procedures. A soft error is an intermittent recoverable error which does not, itself, affect overall reliability of the disk drive system. An occurrence of too many errors will exceed the ability of the disk drive's error correction logic to correct the errors. Disk drive products employ thin film inductive, MIG-ferrite, or magnetoresistive heads to read and write data. It is known that these transducers occasionally exhibit instabilities which affect data read from the disk. Further, such transducers may exhibit multiple response modes wherein a read back signal is significantly different in one mode than in another mode. Some of these modes result in signal distortion that is sufficient to cause hard or uncorrectable error states during the read operation.

Procedures have been developed over the years to allow recovery from such transducer instabilities. For instance, it is known that passing a write current through a write element of the transducer can often change the state of the transducer to a more desirable one, removing the cause of error generation. Most disk drives currently being shipped include a built-in error recovery procedure which includes "write correction" as part of the procedure. The write correction operation generally is performed after the failure of several attempts to reread and error correct the erroneous data.

Transducer-induced error states may also occur when a transducer is in a state which avoids hard errors, yet nevertheless produces a high soft error rate. Prior art disk drive systems monitor the data error rate and generate a system information message indicating that an uncorrectable error state has occurred if an error rate threshold is exceeded. In some applications, a file will be in a read only mode for long periods of time. If a transducer head is in a moderately unstable state that just produces a high rate of soft errors, which high rate does not produce an unrecoverable error state, a head "toggle" procedure will not be implemented and the high soft error rate will persist.

A "toggle" procedure will often improve the operation of a transducer, be it an MIG-ferrite, thin film inductive, or magnetoresistive transducer. For MIG-ferrite and thin film inductive transducers, the most common form of toggle procedure is to cause the transducer to perform a write operation in an area not over usable data and then to reread the written data. This action will normally change the magnetic structure of the transducer adequately to render a poor reading state into a better reading state. Sometimes more than one toggle procedure is required to improve the performance of the transducer.

The prior art is replete with error recovery procedures. U.S. Pat. No. 4,866,712 to Chao describes a multi-stage system recovery strategy which performs a re-initialization or re-setting operation at a lowest level, before a threshold is rendered which would necessitate replacement of a component. More specifically, an error table is provided with one entry for each possible error and contains a count increment for each corrective action that might be taken to correct the error. An error count threshold is provided for each possible corrective action. The Chao system operates to accumulate error count increments against possible actions and when a corresponding threshold is exceeded, initiates a corrective action. U.S. Pat. No. 4,993,029 to Galbraith et al. describes a system for randomizing data stored in a disk drive which avoids recording of data patterns that may stress the ability of the disk drive's error recovery circuitry to identify and correct read data errors. U.S. Pat. No. 4,922,491 to Coale describes a service alert function for disk drive subsystems when an error threshold has been reached. U.S. Pat. No. 5,090,014 to Polich et al. describes a system which logs errors and identifies when components, such as disk drives, are likely to fail. More specifically, an expert system retrieves error entries and processes them to determine whether a failure is likely to occur. U.S. Pat. No. 3,704,363 to Salmassy et al. describes a system for logging data errors in a disk drive. The log information provides an accumulated count of a total number of various types of usage, while error information provides an accumulated count of the total number of various types of errors counted during the usage.

U.S. Pat. No. 5,053,892 to Supino, Jr., et al. describes a disk drive transducer toggling procedure which, upon experiencing an uncorrectable error state, moves the transducer to a non-data containing area and subjects the transducer to a toggle operation. Such toggle operation is not performed if the number of errors in data read from a normal data track is within the capacity of the error correction circuitry to correct. Only when the error correction circuitry indicates an uncorrectable error state is the toggle operation commenced.

For magnetoresistive transducers, there are several ways to change the state of the transducer. Magnetoresistive transducers have separate write and read elements. Application of write potentials to the write element of a magnetoresistive transducer can cause the state of the magnetoresistive transducer to change. Magnetoresistive transducers require a bias current to work properly. The state of the transducer can often be changed by simply turning the bias on or off or selecting a slightly different bias current. All of the above techniques constitute a "toggle".

Accordingly, it is an object of this invention to provide an improved method and system for reducing errors in data read from a disk drive.

It is a further object of this invention to provide a system and method for reducing soft errors experienced during operation of a disk drive.

It is yet another object of this invention to provide a soft error correction procedure for a disk drive which comes into effect prior to the occurrence of an unrecoverable error state.

SUMMARY OF THE INVENTION

A method for reducing errors in data read from a disk drive comprises the steps of: determining errors in data read from a transducer in the disk drive; correcting the errors in data through the use of error correction circuitry; maintaining a metric of the errors in data that are read from the transducer; and when the metric reaches a threshold value, applying a toggle procedure to the transducer in an attempt to improve the transducer's performance. The method further contemplates periodically applying a toggle procedure to the transducer in an attempt to reduce the errors in data, in addition to the application of a toggle procedure when the threshold value is reached.

DESCRIPTION OF THE DRAWINGS

FIG. 2 is a flow diagram illustrating the operation of the invention.

DETAILED DESCRIPTION OF THE INVENTION

Figure 1:
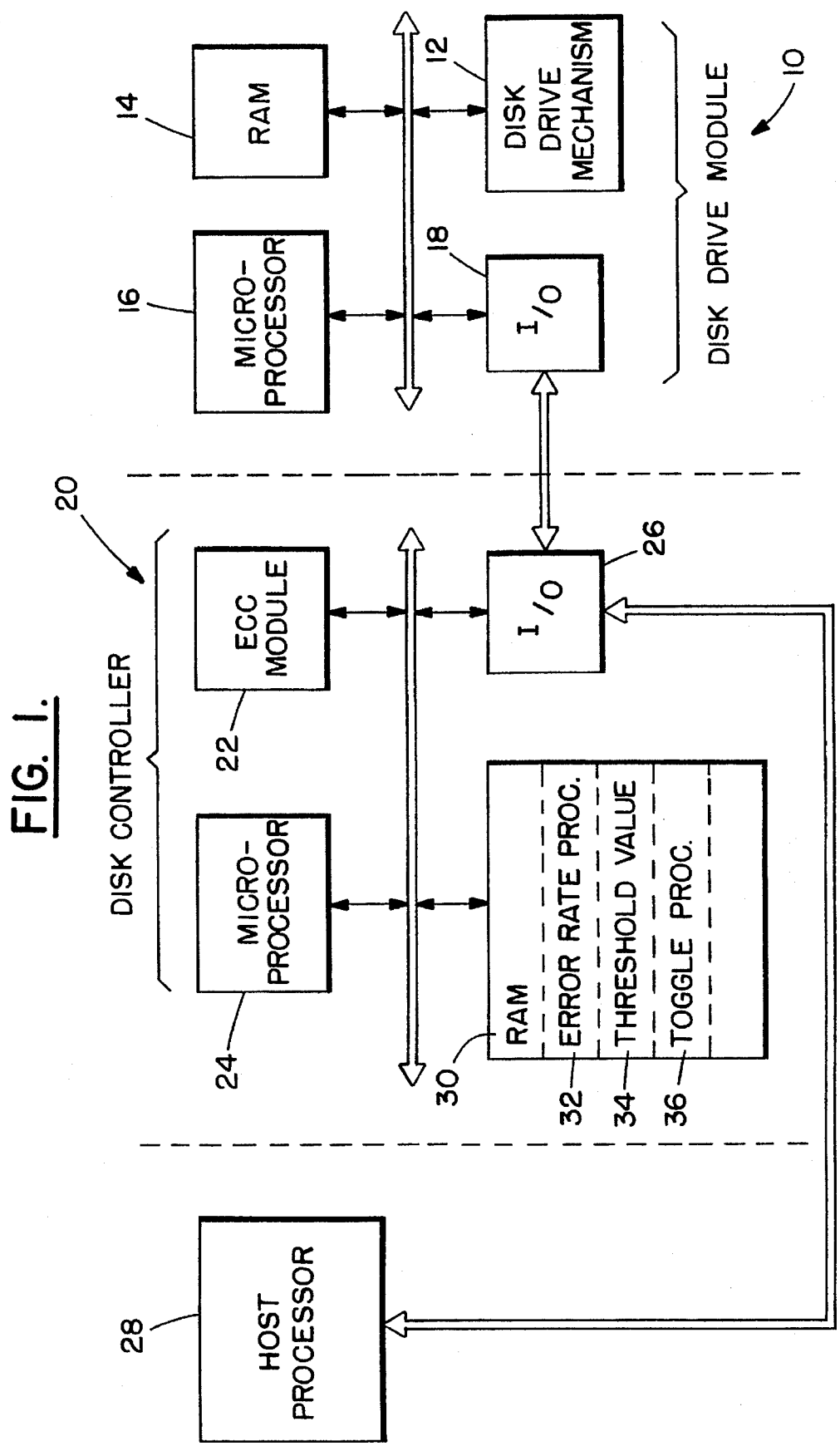
FIG. 1 is a block diagram of a system incorporating the invention.

Referring to FIG. 1, a magnetic disk drive module 10 includes a disk drive mechanism 12 which comprises a plurality of magnetic disks and associated transducers. In the known manner, the transducers are positionable over individually selected cylinders of tracks to provide access to data stored therein. A random access memory (RAM) 14 provides buffering capability for data read to and from the disk drive mechanism 12 and also contains operating procedures for control of microprocessor 16. Microprocessor 16 enables data to be either read from or written to disk, via the transducers associated with disk drive mechanism 12. An input/output (I/O) module 18 provides a data communication pathway between magnetic disk drive module 10 and a disk controller 20.

Disk controller 20 includes an error correction circuit module 22 which appends an appropriate error correction code to data being sent to disk drive module 10 and provides data correction actions with respect to erroneous data sequences read from disk drive module 10. Error correction circuit module 22 is only capable of correcting data errors if their number do not exceed a correctable number. A program-controlled microprocessor 24 governs the transfer of data, instructions and status information via input/output (I/O) module 26 to and from I/O module 26. It further enables data communications to be had with a host processor 28 so as to enable incoming data from host processor 28 to be stored onto disk drive mechanism 12 and to further direct data read from disk drive mechanism 12 back to host processor 28.

Error correction circuit module 22, in the known manner, is able to correct a predetermined number of errors in data read from disk drive module 10. If ECC module 22 is unable to correct an error state, microprocessor 24 issues a system information message back to host processor 28 indicating that an uncorrectable error state has resulted. In the prior art, such an error state would be followed by host processor 28 implementing one or more uncorrectable error recovery procedures. Such procedures generally include (i) multiple re-reads of the data, (ii) an adjustment of the transducer's position within disk drive mechanism 12, followed by an attempted read of the data or (iii) a toggle operation wherein the transducer is moved to a non-data containing area and a write action, followed by a read is performed. Thus, even if data being read from disk drive mechanism 12 had previously been manifesting a high level of soft data errors, so long as ECC module 22 was able to correct those errors, no attempt was made to institute an error recovery procedure.

This invention, by virtue of procedures stored in random access memory 30 in controller 20 performs an error recovery procedure at an earlier stage and thus, forestalls a continuation of a high data error rate. RAM 30 includes an error rate procedure 32 which calculates a continuing ratio of bytes in error to total bytes accessed from disk drive module 10, per unit of time. Note that the "bytes in error" are corrected by error correction circuit module 22 as they do not reach the uncorrectable state. When the calculated error rate reaches a threshold value 34, a toggle procedure 36 is instituted with respect, at least, to the transducer which is generating the erroneous data, and preferably with respect to all transducers in disk drive mechanism 12. Threshold value 34 in RAM 30 is purposely set lower than a data error rate which results in an uncorrectable error state so that the toggle procedure 36 is instituted well before an occurrence of an uncorrectable error state.

Turning to FIG. 2, the procedure employed by the system of FIG. 1 will be further described. The procedure initially commences with a command to perform a read operation (box 46) which is transmitted by disk controller 22 to disk drive module 10. In parallel with the read operation, the procedure determines whether a time T has elapsed since a last toggle procedure (decision box 48) and if not, the procedure recycles. If a time T has elapsed, a toggle procedure is performed across all transducers in disk drive mechanism 12 (box 50). The procedure then recycles.

As indicated above, a read operation causes data to be read from disk drive mechanism 12 and passed to disk controller 20 via I/O modules 18 and 26. In the process of that transfer, if data errors are detected, ECC module 22 determines whether the errors are correctable (decision box 52). If the error state is determined to be not correctable, the procedure moves to decision box 54 where it is determined if too many reread attempts have been attempted. If no, the transducer identifier and track number is stored (box 56) and one or more "uncorrectable" error recovery procedures are tried (box 58). Those procedures include a re-read of the data found to be in error; an offset read of the data that is accomplished by moving the transducers with respect to the data tracks; a toggle applied to one or more of the transducers, etc. (box 58). The procedure then recycles back to box 46 where another read operation is performed and the cycle continues until decision box 54 determines that too many attempts have been made. In such case, the error is declared uncorrectable (box 60) and the procedure completes.

If decision box 52 indicates that the errors are correctable, the procedure moves to box 62 where the error or errors are corrected and an error count maintained for each transducer "X" is incremented in accordance with the number of bytes found to be in error (and corrected) (box 64). Microprocessor 24 then calculates an error rate for transducer "X" and compares the calculated error rate against threshold value 34 (decision box 68). If the error rate is equal to or greater than threshold value 34, a toggle procedure (box 70) is performed and the procedure recycles. If the error rate is found to be less than threshold value 34, the procedure recycles and performs a next read operation. As can thus be seen, toggle operations are performed before an uncorrectable error state is experienced, and errors which result from transducer instabilities are quickly corrected.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for reducing errors in data read from a disk drive, said method comprising the steps of:

a. determining errors in data read from a transducer in said disk drive;

b. correcting said errors in data;

c. maintaining a metric of said errors in data read from said transducer which are corrected;

d. when said metric reaches a threshold value that is less than a metric which indicates an uncorrectable error state, applying a toggle procedure to said transducer in an attempt to reduce said errors in data;

e. moving said transducer to a disk area so as to enable a writing of data without impacting other usable data; and f. applying at least a write excitation to said transducer.

2. The method as recited in claim 1, wherein said transducer is a thin film inductive transducer or a ferrite transducer and said write excitation is followed by a read of data written by said write excitation.

3. The method as recited in claim 1, wherein said transducer is a magnetoresistive transducer having an applied bias current, said magnetoresistive transducer having separate read and write elements, wherein said write excitation is applied to said write element of said transducer.

4. The method as recited in claim 1, comprising a further substep b1:

1. periodically applying a toggle procedure to said transducer in an attempt to reduce said errors in data.

5. The method as recited in claim 1, wherein said toggle procedure is applied to all transducers in said disk drive.

6. A method for reducing errors in data read from a disk drive by a magnetoresistive transducer having an applied bias current, said magnetoresistive transducer having separate read and write elements, said method comprising the steps of;

a. determining errors in data read from a transducer in said disk drive;

b. correcting said errors in data;

c. maintaining a metric of said errors in data read from said transducer which are corrected;

d. when said metric reaches a threshold value that is less than a metric which indicates an uncorrectable error state, applying a toggle procedure to said transducer in an attempt to reduce said errors in data, said toggle procedure altering said applied bias current to said transducer.

7. A system for reducing errors in data read from a disk drive, said system comprising:

error detection means for determining errors in data read from a transducer in said disk drive;

error correction means coupled to said error detection means for correcting said errors in data; and processor means for maintaining a metric of said errors in data read from said transducer that are corrected and when said metric reaches a threshold value that is less than a metric which indicates an uncorrectable error state, causing a toggle procedure to be applied to said transducer in an attempt to reduce said errors in data, said processor means additionally, periodically causing said toggle procedure to be applied to said transducer in an attempt to reduce said errors in data.

8. The system as recited in claim 7, wherein said processor means applies said toggle procedure to all transducers in said disk drive.

* * * * *